United States Patent [19]
Nagano

[11] Patent Number: 5,447,362
[45] Date of Patent: Sep. 5, 1995

[54] QUICK RELEASE APPARATUS FOR A BICYCLE

[75] Inventor: Masashi Nagano, Izumi, Japan

[73] Assignee: Shimano, Inc., Osaka, Japan

[21] Appl. No.: 926,316

[22] Filed: Aug. 10, 1992

[51] Int. Cl.$^6$ ............................................. B60B 27/00
[52] U.S. Cl. .................................. 301/111; 301/110.5; 411/10
[58] Field of Search ...................... 301/111, 114, 105.1, 301/110.5, 124.1; 411/8, 9, 10; 403/27; 116/67 R; 70/225, 233

[56] References Cited

U.S. PATENT DOCUMENTS

| | | | |
|---|---|---|---|
| 3,948,141 | 4/1976 | Shinjo | 411/10 |
| 4,072,081 | 2/1978 | Curtis et al. | 411/10 |
| 4,724,692 | 2/1988 | Turin et al. | 70/225 |
| 4,906,053 | 3/1990 | Kawai | 301/105 B |

FOREIGN PATENT DOCUMENTS

| | | | |
|---|---|---|---|
| 2950254 | 6/1981 | Germany | 411/9 |
| 56304 | 6/1954 | Japan . | |
| 2179459 | 3/1987 | United Kingdom . | |

*Primary Examiner*—Russell D. Stormer
*Attorney, Agent, or Firm*—Dickstein, Shapiro & Morin

[57] ABSTRACT

A quick release apparatus includes a tightening shaft including a screw portion at one end thereof, a tightening control lever mounted on the other end of the tightening shaft, and a clamp mounted on the screw portion. The clamp includes a nut meshed with the screw portion, a contact element axially movable relative to the nut and including a surface for contacting an object, and an elastic element disposed between the nut and the contact element. The contact element and nut are disposed coaxially with the tightening shaft to be rotatable relative to each other around the tightening shaft. This quick release apparatus further includes a displacement amplifying link mechanism such as a single lever mechanism for amplifying a relative axial displacement between the nut and contact element. A subtle relative displacement between the nut and contact element is presented as an enlarged displacement for observation purposes.

11 Claims, 4 Drawing Sheets

QUICK RELEASE APPARATUS FOR A BICYCLE

BACKGROUND OF THE INVENTION

1. Field of the Invention

The present invention relates to a quick release apparatus, particularly one for use on a bicycle, including a tightening shaft including a screw portion at one end thereof, a tightening control device mounted on the other end of the tightening shaft and a clamp device mounted on the screw portion of the tightening shaft, for tightening an object between the tightening control device and clamp device.

2. Description of the Related Art

In a conventional quick release apparatus of this type, the clamp device includes a nut meshed with the screw portion, a contact element axially movable relative to the nut and including a surface for contacting an object, and an elastic element disposed between the nut and contact element. In the apparatus disclosed in Japanese Patent Publication Laying-Open No. 1981-304, for example, the nut and contact element are interconnected not to be rotatable relative to each other, and are movable close to each other with rotation of the contact element. An elastic element mounted between the nut and contact element is deformed by the movement of the nut and contact element toward each other, for adjusting a tightening force applied to an object. The tightening force may be confirmed by means of an amount of projection of the nut relative to the contact element or an amount of movement of the nut on the tightening shaft. The elastic element used in this apparatus has a strong elasticity to provide a strong tightening force. Consequently, the tightening force applied to the object is variable to a large degree by a slight axial displacement of the nut. It requires small but additional effort to effect optimum adjustment of the tightening force while observing an amount of projection of the nut relative to the contact element or an amount of movement of the nut on the tightening shaft.

SUMMARY OF THE INVENTION

The object of the present invention is to provide a quick release apparatus for enabling quick and easy adjustment of a tightening force applied to an object.

The above object is fulfilled, according to the present invention, by a quick release apparatus including a displacement amplifying device for amplifying a relative displacement between the nut and contact element, and a displacement display device for displaying the displacement amplified by the displacement amplifying device.

With the above construction, a relative displacement between the nut and contact element is amplified for display to enable an accurate confirmation of an amount of deformation of the elastic element. Thus, a tightening force may be fine-adjusted by means of the nut, whereby the object is tightened by a proper tightening force quickly and simply.

In a preferred embodiment of the present invention, the contact element and nut are disposed coaxially with the tightening shaft to be rotatable relative to each other around the tightening shaft. This construction allows the nut to be rotated with ease even after the tightening force is increased, to facilitate fine adjustment of the tightening force. In addition, contacting surfaces of the object and contact element may be fixed when the nut is rotated, which protects the surfaces from damage due to slippage.

A displacement amplifying link mechanism, in particular a single lever mechanism having a simple construction, is proposed as a form of the displacement amplifying device according to the present invention. This lever mechanism amplifies a relative axial displacement between the nut and contact element for output to the displacement display device. The single lever mechanism includes an oscillatable member having a pivotal point, an input point, and an output point spaced a greater distance from the pivotal point than the input point. The pivotal point is defined by the nut, and the input point is a pressure point on a displacement input ring extending from the contact element, a displacement of the output point being applied to the display device which is an axially movable tubular member linked to the output point of the oscillatable member.

The oscillatable member may be a disk spring. In this case, the construction is further simplified in that an external urging device is not required since the oscillatable member inherently possesses an urging force for contacting the contact element.

Other features and advantages of the present invention will be apparent from the description of the preferred embodiments to be had with reference to the drawings.

DETAILED DESCRIPTION OF THE PREFERRED EMBODIMENTS

Figure 1:
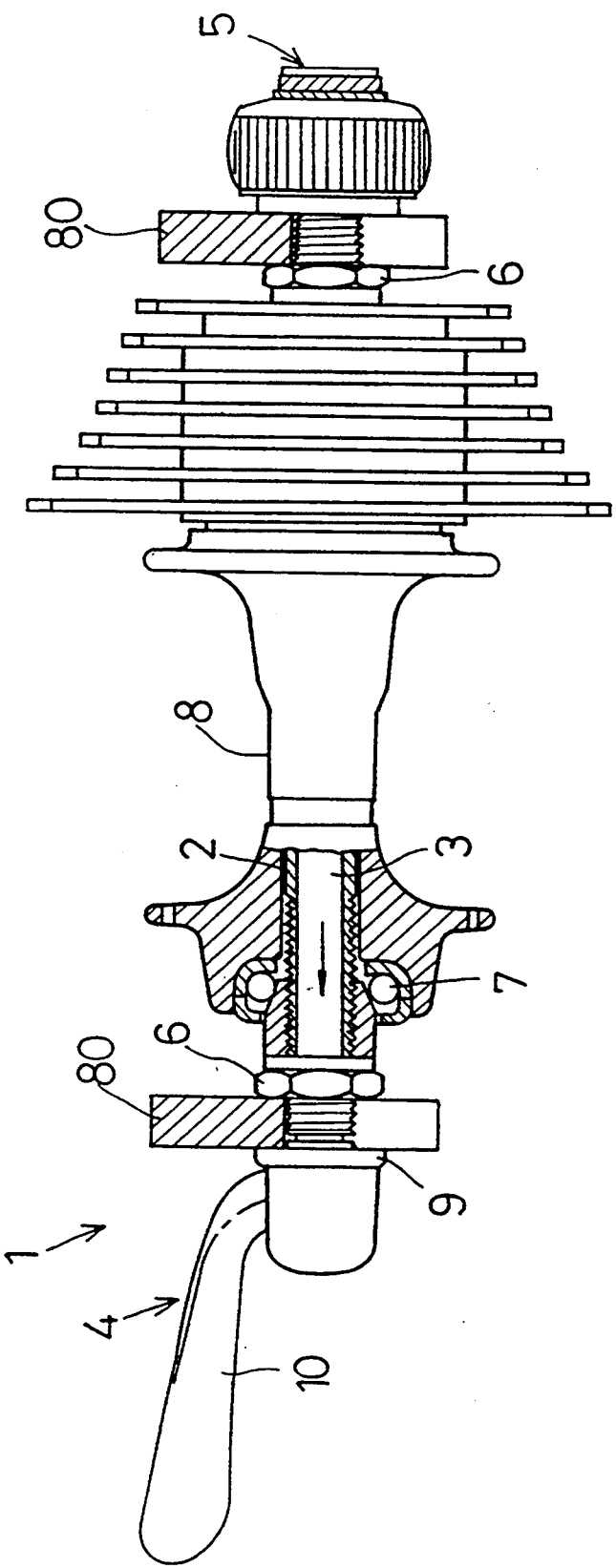
FIG. 1 is a view, partly in section, of a quick release apparatus for use on a bicycle in a first embodiment of the present invention.

FIG. 1 shows a quick release apparatus in a first embodiment of the present invention, which is employed for mounting a bicycle hub. This quick release apparatus 1 includes a tubular body 2, a tightening shaft 3 slidably mounted in the tubular body 2, a tightening control device 4 mounted on one end of the tightening shaft 3, an adjusting clamp device 5 meshed with a screw 3a (FIG. 2) defined on the other end of the tightening shaft 3, and inner contact elements 6 mounted on opposite ends of the tubular body 2 for contacting inward surfaces of fork ends 80 of a bicycle. These fork ends 80 constitute an object to be tightened. A hub 8 is mounted on the tubular body 2 to be rotatable relative thereto through bearings 7. The tightening control device 4 includes a housing 9 having a contact surface for contacting an outward surface of one of the fork ends 80. A control lever 10 extends into the housing 9 to be pivotable about an axis perpendicular to the tightening shaft 3. A cam mechanism (not shown) which is itself known is provided between a proximal end of the control lever 10 and one end of the tightening shaft 3. When the control lever 10 is turned over, the known cam mechanism narrows, axially of the tightening shaft 3, a space between the housing 9 and the inner contact element 6 opposed thereto, and a space between the clamp device 5 and the inner contact element 6 opposed thereto. Consequently, the apparatus is tightened to the fork ends 80 to maintain the entire assembly as a fixed unit.

Figure 2:
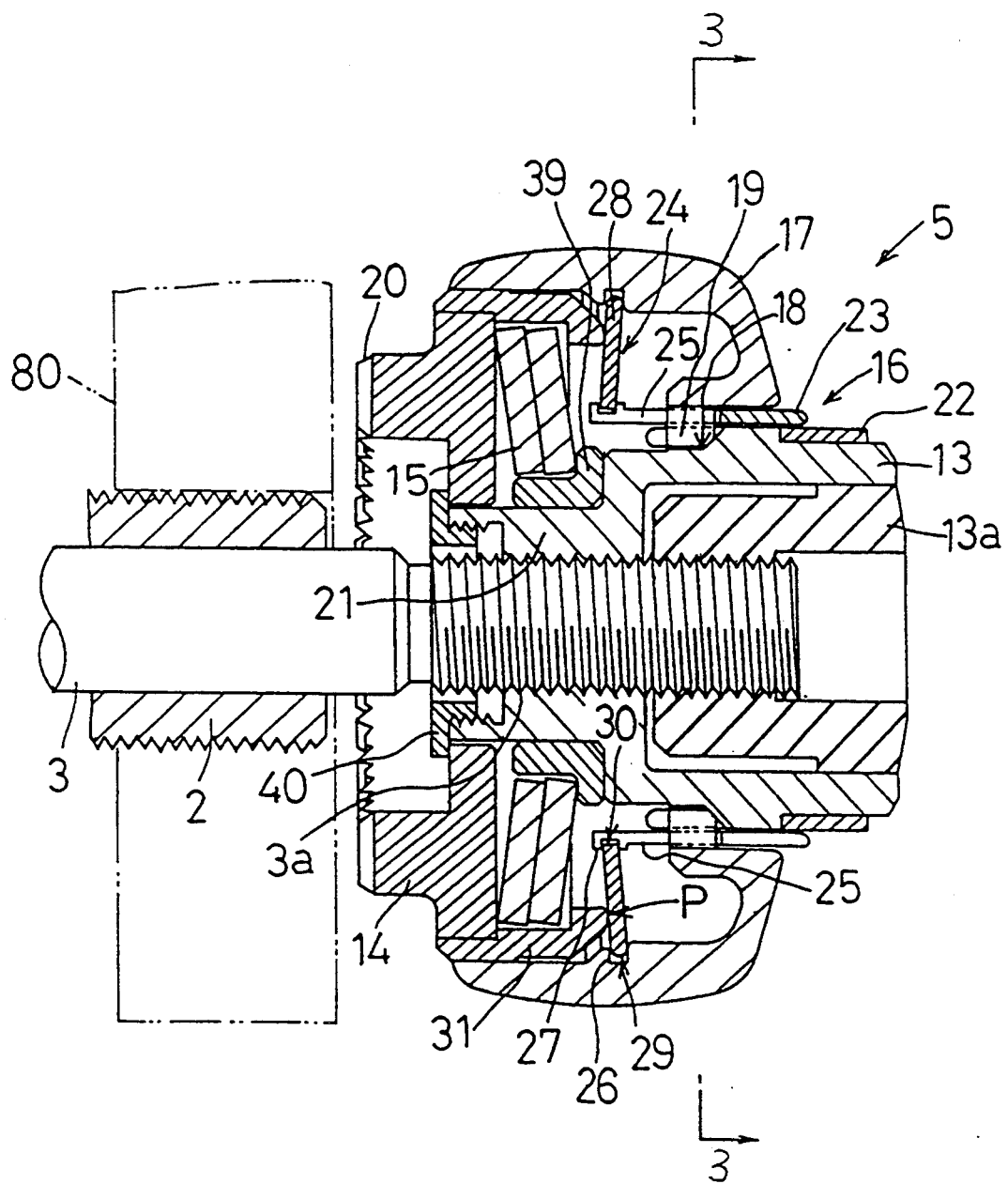
FIG. 2 is a view in vertical section of a clamp device prior to clamping action.

As shown in FIG. 2, the clamp device 5 includes a nut 13 meshed with the screw 3a, a contact element 14 for contacting the other fork end 80, and elastic members 15 mounted between the nut 13 and contact element 14. As will be described in detail later, the clamp device 5 further includes a displacement amplifying device 24 for increasing a relative axial displacement between the nut 13 and contact element 14, and an indicating device 16 for displaying an increased displacement.

Figure 3:
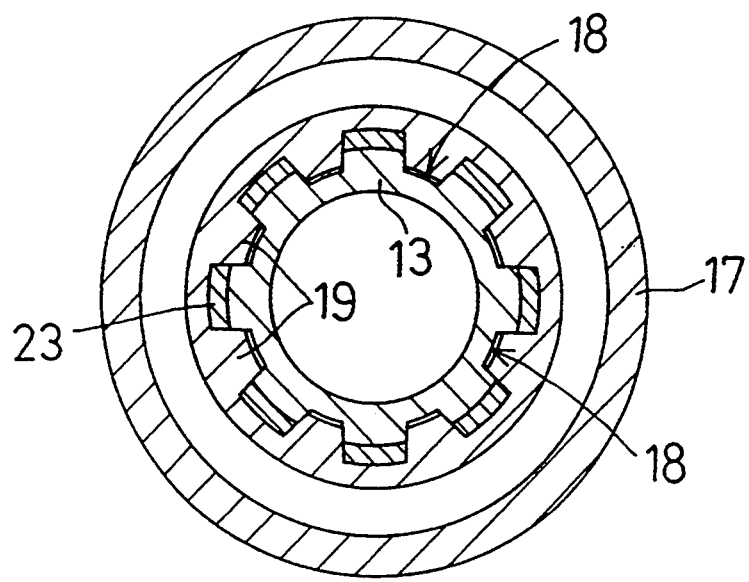
FIG. 3 is a section taken on line A—A of FIG. 2.

A control ring 17 is mounted on the nut 13 to be rotatable relative to the contact element 14 for turning the nut 13. Specifically, as shown in FIG. 3, the control ring 17 includes a plurality of projections 19 formed on an inside wall thereof and engaged with a plurality of recesses 18 formed on an outside wall of the nut 13. Thus, the control ring 17 and nut 13 are not rotatable relative to each other. The nut 13 is turned to move along the screw 3a toward the fork end 80. At the same time, the control ring 17 also moves axially. As shown in FIG. 2, the contact element 14 defines a knurled contact surface 20 opposed to the fork end 80 to increase resistance of contact with the fork end 80. In FIG. 2, numeral 13a denotes a plastic split nut meshed with the screw 3a for preventing loosening of the nut 13. Numeral 39 denotes a spring bearing ring mounted on a stepped outer wall of the nut 13.

The elastic members 15 comprise two disk springs which are axially compressible between the contact element 14 and a sleeve 21 mounted on the screw 3a. The contact element 14 is in the form of a ring inserted into an annular space defined between an outer periphery of the nut 13 and an inner periphery of the control ring 17 to be displaceable around and axially of the tightening shaft 3. The contact element 14 is retained in place by a stop ring 40.

The nut 13 carries a reference sleeve 22 mounted peripherally of an outward end thereof. Further, an indicator tube 23 is slidably mounted between the nut 13 and control ring 17. The indicator tube 23 has an outward end overlying the indicator tube 23. The indicator tube 23 defines a plurality of cutouts 25 for receiving the projections 19 of the control ring 17. An inward end of the indicator tube 23 extends into the annular space defined between the control ring 17 and nut 13.

Figure 4A:
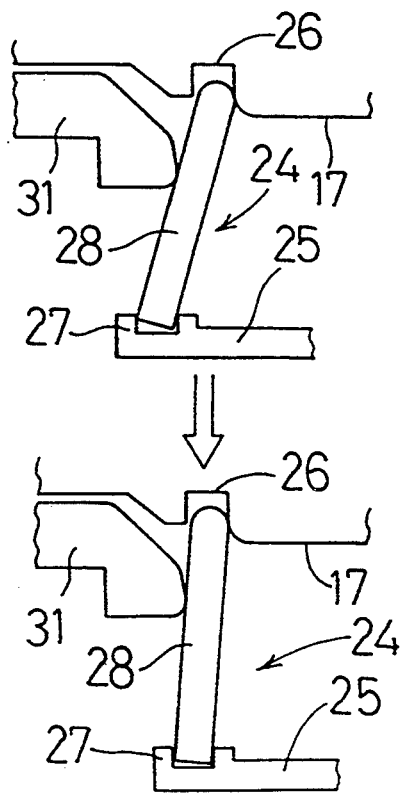
FIG. 4A is a schematic view showing a first displacement utilizing state of a disk spring acting as a displacement amplifying device.
Figure 4B:
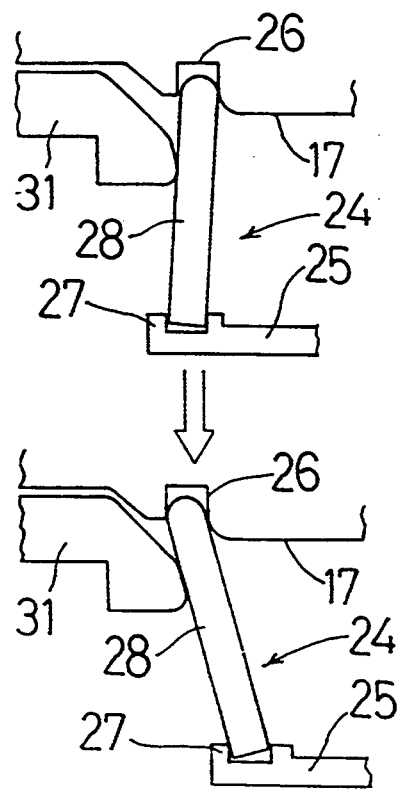
FIG. 4B is a schematic view showing a second displacement utilizing state of the disk spring.

The displacement amplifying device 24 basically is formed of a plastic disk spring 28 having an outer periphery 29 thereof engaged with a first engaging portion 26 formed inside the control ring 17, and an inner periphery 30 engaged with a second engaging portion 27 defined on the inward end of the indicator tube 23. The disk spring 28 is in contact with a displacement input ring 31 extending from the contact element 14 in the direction opposite to the contact surface 20. The displacement input ring 31 has a contact position P for contacting the disk spring 28, which is close to the outer periphery 29 of the disk spring 28. A relative displacement between the first engaging portion 26 and displacement input ring 31 resulting from turning of the control ring 17 is increased by the principle of leverage and outputted to the second engaging portion 27 of the indicator tube 23. The increased displacement is visually confirmed as an amount of movement of the outward end of the indicator tube 23 on the reference sleeve 22. It will be understood that the indicating device 16 is formed of the reference sleeve 22 and indicator tube 23. Preferably, the reference sleeve 22 has a colored graduation on an outside surface thereof for showing tightening amounts. As described above, this embodiment employs the disk spring 28 as a single lever mechanism. As shown in FIGS. 4A and 4B, displacement of the disk spring 28 may be used in two modes. FIG. 4A shows a mode of using a region of displacement prior to a displacement of the disk spring 28 through a flattened phase to an opposite side. This mode is suited where displacement of the is displacement input ring 31 to be detected is in a small amount. FIG. 4B shows a mode of using a region of displacement after the displacement of the disk spring 28 through the flattened phase to the opposite side. This mode is suited where displacement of the displacement input ring 31 to be detected is in a large amount.

Figure 5:
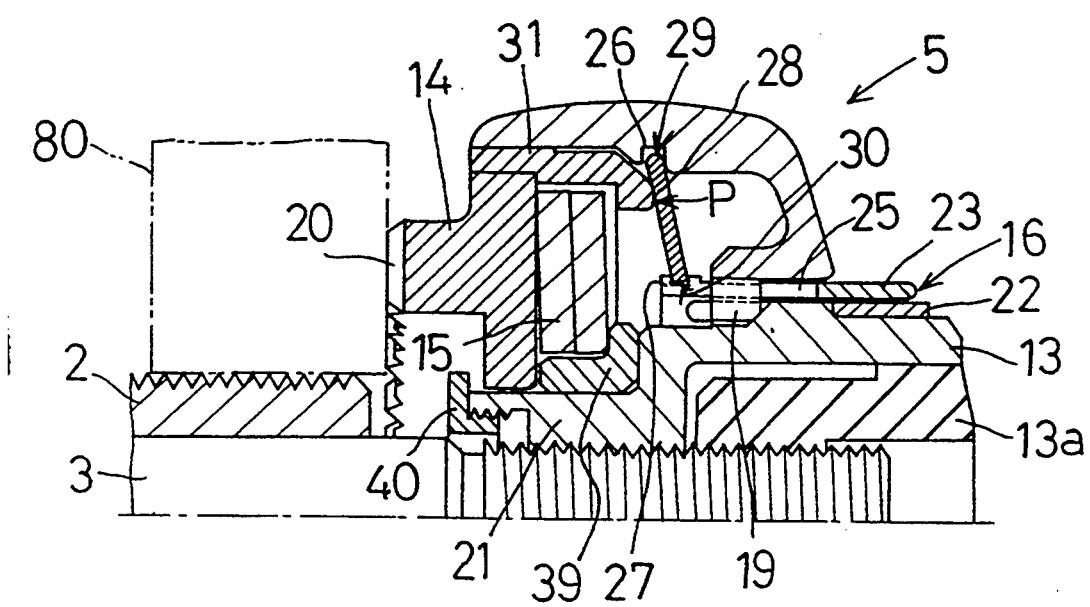
FIG. 5 is a view in vertical section of the clamp device after clamping action.

This embodiment uses the displacement mode of the disk spring 28 shown in FIG. 4B. When the control lever 10 is turned over after the control ring 17 is rotated in a tightening direction, the reference sleeve 22 moves toward the contact element 14, and the indicator tube 23 moves away therefrom, with the outward ends of the reference sleeve 22 and indicator tube 23 moving close to each other as shown in FIG. 5. Because of the opposite movement of the reference sleeve 22 and indicator tube 23 and the action of the displacement amplifying device 24, the relative axial displacement between the ends of the reference sleeve 22 and indicator tube 23 becomes far greater than that between the contact element 14 and nut 13, to facilitate visual confirmation. Subsequently, the control ring 17 may be rotated as necessary to effect fine adjustment of the elastic deformation of the elastic members 15 or a tightening force of the quick release apparatus 1.

Figure 6:
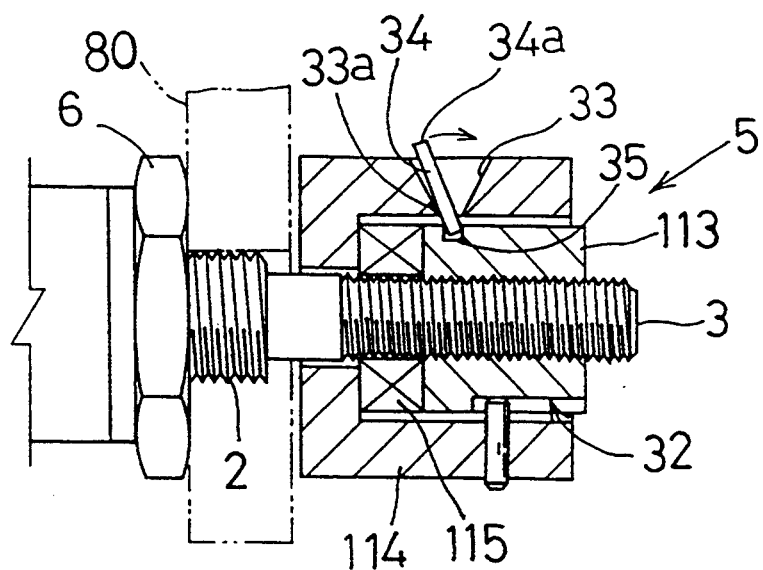
FIG. 6 is a view in vertical section of a quick release apparatus, in particular a clamp device, in a second embodiment of the present invention.

FIG. 6 shows a clamp device of a quick release apparatus in another embodiment of the present invention.

This damp device includes a cup-shaped contact element 114 having a perforated bottom, and a nut 113 screwed to the tightening shaft 3 and mounted in the cup-shaped contact element 114. The contact element 114 and nut 113 are arranged coaxially with the tightening shaft 3 extending through the perforated bottom of the contact element 114. The contact element 114 and nut 113 are interconnected through a guide device including a pin and groove (which is itself known) to be axially movable and not rotatable relative to each other. According to this construction, rotation of the contact element 114 causes the nut 113 to press the contact element 114 against an object through an elastic member 115. The contact element 114 includes one or more slits 33 distributed circumferentially of a cylindrical wall thereof. The or each slit 33 converges axially as it extends inwardly of the cylindrical wall. An indicator piece 34 is mounted in the or each slit 33, with a proximal end thereof extending into an engaging recess 35 formed in the nut 113, so that a distal end 34a of the indicator piece 34 is oscillatable axially. A relative displacement between the contact element 114 and nut 113 resulting from rotation of the contact element 114 causes the distal end 34a of the indicator piece 34 to swing on a fulcrum provided by a corner 33a of the slit 33 defined inwardly of the cylindrical wall. Consequently, the relative displacement between the contact element 114 and nut 113 is amplified for confirmation purposes. Preferably, the indicator piece 34 is urged to a home position by an urging device.

The displacement amplifying device 24 in the two foregoing embodiments employs a single lever mechanism, but may employ a double or triple lever mechanism. A cam mechanism, a rack and pinion mechanism or the like may be used instead.

The quick lever apparatus according to the present invention is not limited to mounting of a bicycle hub, but may be used in various other applications such as adjustment of a saddle height.

What is claimed is:

1. A quick release apparatus comprising:
   a tightening shaft including a screw portion at one end thereof;
   tightening control means mounted on the other end of said tightening shaft;
   clamp means mounted on said screw portion and including:
     a nut threaded onto said screw portion,
     a contact element axially movable relative to said nut and including a contact surface, said nut and said contact element being relatively displaceable, and
     an elastic element disposed between said nut and said contact element;
   displacement amplifying means for amplifying the relative displacement between said nut and said contact element; and
   displacement display means for displaying said displacement amplified by said displacement amplifying means.

2. An apparatus as claimed in claim 1, wherein said contact element and said nut are disposed coaxially with said tightening shaft to be rotatable relative to each other around said tightening shaft.

3. An apparatus as claimed in claim 2, wherein said contact surface of said contact element is knurled.

4. An apparatus as claimed in claim 1, wherein said displacement amplifying means includes a cam provided on said nut, and a cam follower provided on said contact element, an axial displacement of said cam being amplified and outputted to said cam follower.

5. An apparatus as claimed in claim 1, wherein said displacement amplifying means is formed as a displacement amplifying link mechanism for amplifying a relative axial displacement between said nut and said contact element for output to said displacement display means.

6. An apparatus as claimed in claim 5, wherein said displacement amplifying link mechanism is formed as a single lever mechanism.

7. An apparatus as claimed in claim 6, wherein said single lever mechanism includes an oscillatable member having a pivotal point, an input point, and an output point spaced a greater distance from said pivotal point than said input point, said pivotal point being defined by said nut, said input point being a pressure point on a displacement input ring extending from said contact element, a displacement of said output point being applied to said displacement display means.

8. An apparatus as claimed in claim 7, wherein said oscillatable member is a disk spring.

9. An apparatus as claimed in claim 7, wherein said displacement display means includes an axially movable tubular member linked to said output point of said oscillatable member.

10. An apparatus as claimed in claim 9, wherein said tubular member has an outer peripheral surface having a colored graduation corresponding to tightening forces.

11. An apparatus as claimed in claim 1, wherein said contact surface is arranged to contact a bicycle fork end.

* * * * *